United States Patent [19]
Gerard et al.

[11] Patent Number: 6,073,685
[45] Date of Patent: Jun. 13, 2000

[54] FLUID INLET/OUTLET CHAMBER AND CORRESPONDING FLUID CIRCULATION APPARATUS

[75] Inventors: Claude Gerard, Chantraine; Jean-Yves Lehman, Maison-Alfort, both of France

[73] Assignees: L'Air Liquide, Societe Anonyme pour l'Etude et l'Exploitation des Procedes Georges Claude, Paris Cedex; Nordon Cryogenie SNC, Golbey, both of France

[21] Appl. No.: 08/578,234

[22] Filed: Dec. 26, 1995

[30] Foreign Application Priority Data

Dec. 23, 1994 [FR] France ................................... 94 15619

[51] Int. Cl.⁷ ..................................................... F28B 3/00
[52] U.S. Cl. ................ 165/111; 165/166; 165/DIG. 183; 96/185; 137/561 A
[58] Field of Search ..................................... 165/166, 111, 165/911, DIG. 183; 96/185, 218; 137/561 A

[56] References Cited

U.S. PATENT DOCUMENTS

| | | | |
|---|---|---|---|
| 1,740,145 | 12/1929 | Bates ................................... | 165/166 X |
| 2,364,058 | 12/1944 | Burk et al. ........................... | 137/561 A |
| 2,373,099 | 4/1945 | Burk ..................................... | 137/561 A |
| 2,953,110 | 9/1960 | Etheridge ................................. | 165/166 |
| 3,311,166 | 3/1967 | Southam ................................. | 165/166 |
| 3,313,343 | 4/1967 | Wave et al. ............................. | 165/166 |
| 3,877,519 | 4/1975 | Tramuta et al. ......................... | 165/166 |
| 4,272,462 | 6/1981 | Butt ..................................... | 165/166 X |
| 4,969,507 | 11/1990 | Rosenblad ........................... | 165/111 X |
| 5,031,693 | 7/1991 | Van Dyke ............................... | 165/166 |
| 5,228,515 | 7/1993 | Tran ..................................... | 165/166 |
| 5,333,683 | 8/1994 | Arriulou et al. ......................... | 165/166 |

FOREIGN PATENT DOCUMENTS

| | | |
|---|---|---|
| 0 010 083 | 4/1980 | European Pat. Off. . |
| 0 566 435 | 10/1993 | European Pat. Off. . |
| 1901475 | 8/1970 | Germany . |

*Primary Examiner*—Christopher Atkinson
*Attorney, Agent, or Firm*—Young & Thompson

[57] ABSTRACT

Input/output chamber for a fluid, for part of a body (1) of an apparatus in which this fluid circulates, this part of the body including a face (3) for inlet or outlet of the said fluid, the chamber (6A) being intended to be connected with a leak-tight joint to this face. At least part of the chamber consists of at least one spherical or ellipsoidal portion (20A) and of sectors of cones (22A) tangential to this spherical or ellipsoidal portion.

26 Claims, 2 Drawing Sheets

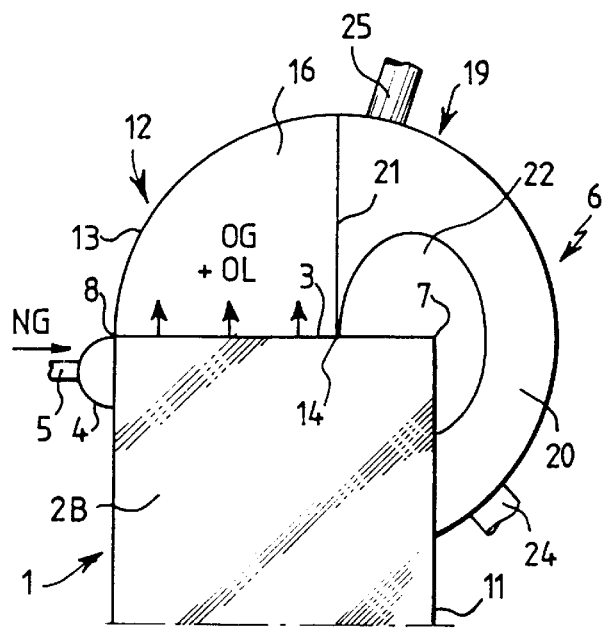
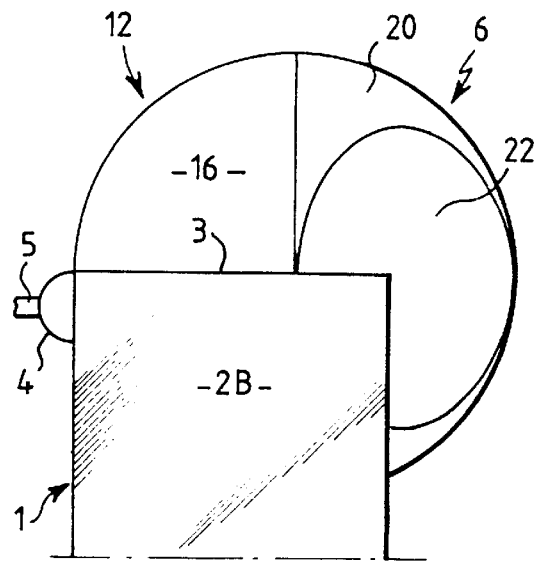
FIG. 1  FIG. 3
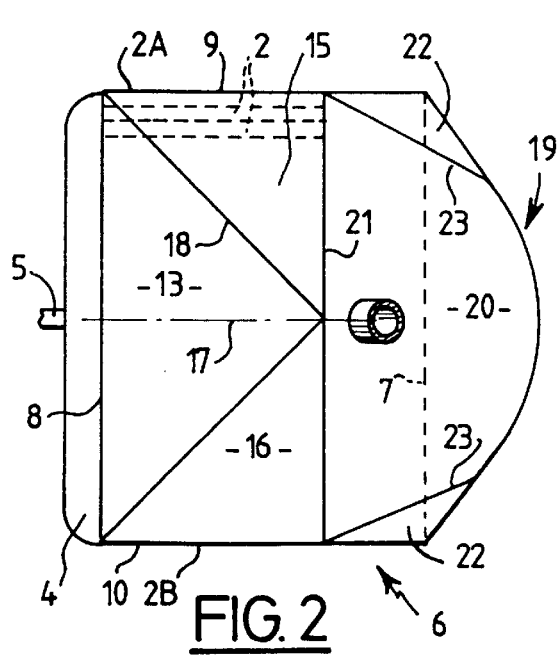
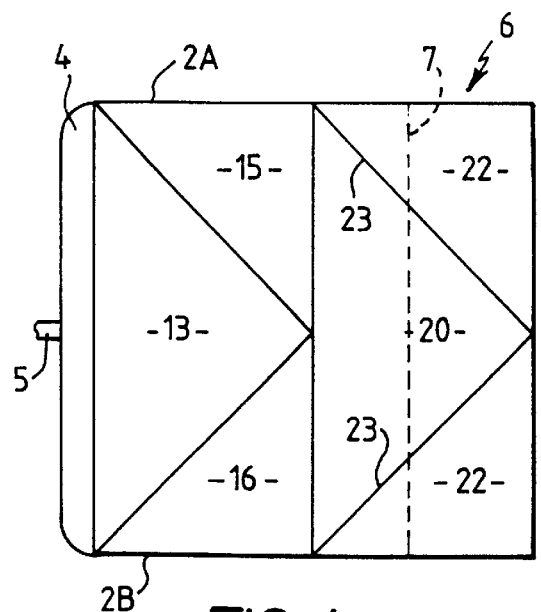
FIG. 2  FIG. 4

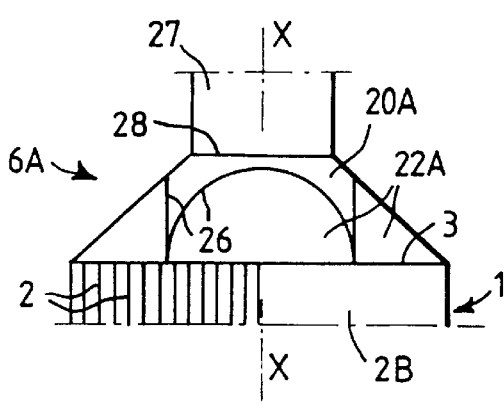
FIG. 5
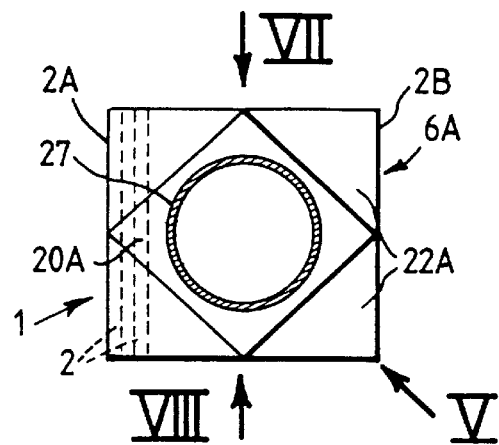
FIG. 6
FIG. 7
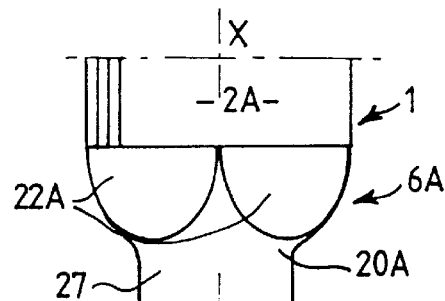
FIG. 8
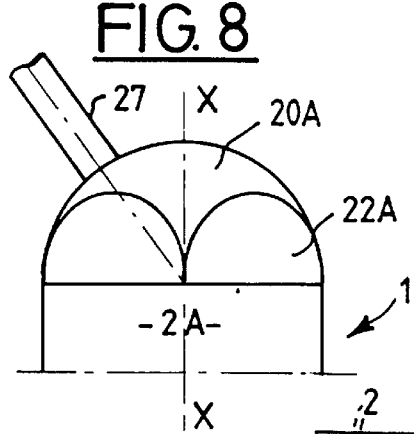
FIG. 9
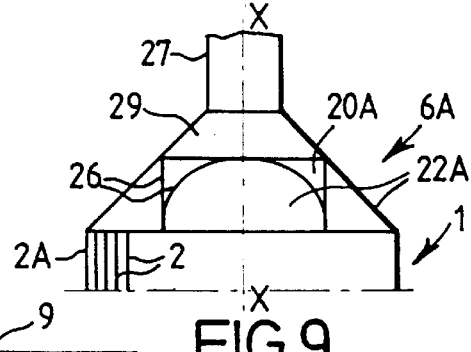
FIG. 10
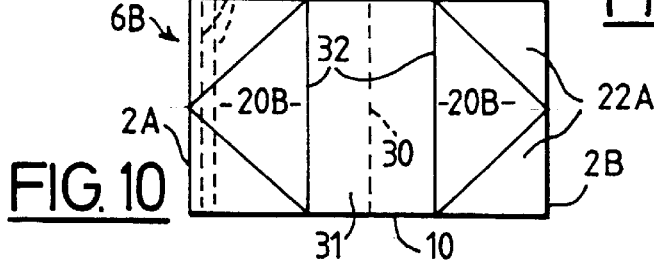
FIG. 11
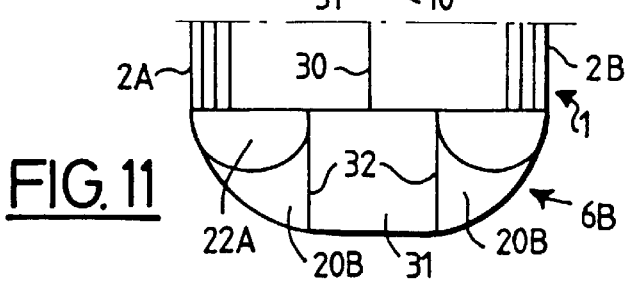

FLUID INLET/OUTLET CHAMBER AND CORRESPONDING FLUID CIRCULATION APPARATUS

The present invention relates to an inlet/outlet chamber for a fluid, for a body part of an apparatus in which this fluid circulates, this body part or body portion including a face for inlet or outlet of the said fluid, the chamber being intended to be connected with a leaktight joint to this face.

The invention applies in particular to heat exchangers, of the thermosyphon type or of the falling-film type, treating especially at least one two-phase fluid, such as the evaporators/condensers of air-distillation plants, the evaporators of refrigeration units, the reboilers of distillation columns or alternatively to certain heat exchangers placed in confined spaces, such as the inter-stage exchangers of certain compressors.

The invention is to provide an easy inlet/outlet chamber which is easy to connect to rectangular or square contours, which is able to withstand internal pressure particularly well and offers flexibility in the connection of fluid supply or discharge pipes.

For this purpose, the subject of the invention is an inlet/outlet chamber as defined hereinabove, characterized in that at least part of the chamber consists of at least a spherical or ellipsoidal portion and of sectors of cones tangential to this spherical or ellipsoidal portion.

In particular, the inlet/outlet chamber may be intended to be connected to the entire perimeter of the said face. In this case, when the said face is rectangular or square, the chamber may especially comprise, on the one hand, two first surfaces in the form of spherical or ellipsoidal portions, these first surfaces being substantially tangential to two opposite sides of the rectangle or square and, on the other hand, four second surfaces in the form of sectors of cones whose vertices lie on the four corners of the said face, respectively, and are tangential in pairs to the two first surfaces.

In one embodiment, the said spherical or ellipsoidal portions are quarters of a sphere or of an ellipsoid, a meridional plane of which is contained in the said face, and the sectors of cones are half-cones having an opening of 90°.

In one embodiment, in the case where the said face is square, the two first surfaces are joined together into a single spherical surface.

In another embodiment, in the case where the said face includes two short sides and two long sides, the said opposite sides are the short sides and the chamber furthermore includes a cylindrical surface connected to the circular edges, perpendicular to the said face, of the two first surfaces.

The inlet/outlet chamber may, moreover, include a feed or discharge pipe tapped off from the spherical or ellipsoidal portion, either directly or via a transition surface in the form of a truncated cone, especially a surface tangential to the spherical or ellipsoidal portion.

In one embodiment, the inlet/outlet chamber projects, with respect to the said part of the body, beyond the said face, and is also intended to be connected with a leaktight joint to the adjacent face of the said body part.

In this case, according to one embodiment, the spherical or ellipsoidal portion is a hemisphere or a semi-ellipsoid surmounting the top edge which joins the two faces, and the chamber furthermore comprises another portion formed by three cylindrical surfaces having mutually perpendicular axes.

According to an advantageous embodiment, the chamber consists entirely of surfaces, especially spherical or ellipsoidal, conical and cylindrical surfaces, which are joined together tangentially.

The subject of the invention is also a fluid circulation apparatus comprising a body pat which includes a fluid inlet or outlet face and an inlet/outlet chamber as defined hereinabove, connected with a leaktight joint to this face.

When the said body part is formed by a stack of parallel plates defining between them flat passages, by corrugated spacers arranged between these plates and by bars for sealing off the passages, the bars corresponding to the said fluid leaving an inlet or an outlet free for this fluid, in an embodiment which is particularly advantageous in the case where the said fluid is under pressure, the chamber is connected to the said body part only along zones of this part which are formed by end portions of plates or by sealing bars.

In one embodiment of the apparatus, the chamber is joined tangentially to the said body part.

Examples of embodiment of the invention will now be described with regard to the appended drawings, in which:

FIG. 1 is a partial side view of a heat exchanger according to the invention;

FIG. 2 is a plan view of this exchanger;

FIGS. 3 and 4 are views respectively similar to FIGS. 1 and 2, but corresponding to an alternative form;

FIG. 5 is a view, taken by looking along the arrow V of FIG. 6, of another heat exchanger according to the invention;

FIG. 6 is a plan view of the exchanger of FIG. 5;

FIG. 7 is a view taken along the arrow VII of FIG. 6;

FIG. 8 is a view taken along the arrow VIII of FIG. 6, illustrating an alternative form;

FIG. 9 is a view similar to FIG. 5 of another alternative form;

FIG. 10 is a plan view of another heat exchanger according to the invention; and FIG. 11 is a view taken along the arrow XI of FIG. 10.

FIGS. 1 and 2 show diagrammatically the top part of an exchanger body 1 of parallelepipedal shape, elongate in the vertical direction, of the brazed-plate type. This is, for example, the main evaporator/condenser of a double air-distillation column, of the thermosyphon type, intended to evaporate liquid oxygen at atmospheric pressure or at a higher pressure, which may range up to 5 bar absolute or higher, by condensation of nitrogen. Reference will be made to this example hereinbelow.

More particularly, the body 1 consists of a stack of vertical and parallel rectangular plates 2 between which are interposed corrugated spacers, which also form thermal fins. Each pair of plates 2 defines a passage of generally flat shape. At least two series of passages exist, one of which is reserved for the circulation of oxygen, constituting the treated fluid, while the other serves to circulate nitrogen, which constitutes the auxiliary fluid generating heat during condensation.

On their periphery, the passages are sealed off by bars. The bars corresponding to the treated fluid are, however, eliminated on the top face 3 of the body 1 and also on its bottom face. The exchanger thus operates as a thermosyphon, with ascending circulation of evaporated oxygen, entraining liquid oxygen. The two-phase mixture leaves the body 1 via its top face 3.

The sealing bars are, moreover, arranged so as to leave free, on the vertical lateral faces of the body 1, horizontal rows of nitrogen inlet/outlet windows. These windows are surmounted by inlet/outlet boxes of cylindrical general shape, such as the box 4 shown in the drawing, this box being provided at the top part of the body and serving as the inlet for gaseous nitrogen into the nitrogen passages, which box is fed via a pipe 5.

The body 1 is completed by a bulb 6 which will be described in detail later.

The body 1 is produced by a stack of plates, spacers and bars, and by oven brazing in a single step. The inlet/outlet boxes, such as the box 4, are attached to the body 1 by welding, as is the chamber 6.

The bulb 6 covers the top edge 7 of the body 1, opposite the box 4, and has a wide opening made as a single piece whose edge, lying in two planes perpendicular to each other, is connected with a leaktight joint by welding to the face 3 along the top edge 8 of the body, opposite the top edge 7, and along the two other top edges 9 and 10 of the body 1. The edge of the bulb 6 is also connected with a leaktight joint by welding to that vertical face 11 of the body 1 which is adjacent to the face 3 alongside the top edge 7. This face 11 will be designated "front face" hereafter for convenience.

The bulb 6 includes a rear part 12 in the form of a half-dome, consisting of three metal sheets:

a central metal sheet 13 in the form of a quarter of a cylinder with a horizontal axis 14 contained in the upper face 3 of the exchanger body 1 and parallel to the top edges 7 and 8, this metal sheet 13 starting at the rear edge 8; and two cylindrical lateral metal sheets 15, 16, of the same radius as the metal sheet 13, having a common axis 17 contained in the face 3 and perpendicular at its middle to the top edge 7, these two metal sheets starting respectively from the two lateral top edges 9, 10 of the same face 3.

The three metal sheets 13, 15 and 16 are welded together along their double insertion curve 18, which has the shape of a right-angled V in plan view (FIG. 2).

The bulb 6 is completed by a sphero-conical front part 19. More precisely, this front part essentially comprises a truncated hemisphere 20 which goes forwards from the limiting semicircle 21 of the metal sheets 15 and 16, this semicircle lying plumb with the axis 14, and which overlaps the front top edge 7 of the body 1. Provided on each side is a metal sheet 22 in the form of three-quarters of a cone, the vertex of which lies over the corresponding front top corner of the body 1, these cones having an opening such that they are joined tangentially to the hemisphere along a circle 23 and such that they have a generatrix coincident with the respective top edge 9, 10. Those portions of the hemisphere lying within the circles 23 have been removed.

By virtue of this arrangement, it is possible to make straight line welds on the edge of the bulb along the three top edges 8 to 10 of the exchanger body, and to complete the leaktight joint of the bulb to the body on the front face 11. This joint is made along the vertical edges of the face 11, over a length corresponding to the generatrix of the cones 22, and then along a circular arc corresponding to the intersection of the hemisphere 20 with the face 11.

The alternative form in FIGS. 3 and 4 differs from the previous one only by the fact that the vertex of the cones 22, 23 is brought forwards until it lies in the vertical plane tangential to the hemisphere 20 so that the opening angle of these cones is 90°.

It may be seen that the edge of the opening of the bulb 6 is welded along the top edge 8, which is formed by the top end portions of the plates 2 and of the sealing bars, along the top edges 9 and 10, formed by the top end portions of the outermost plates 2A and 2B, and along the front face 11, formed by the vertical end portions of the plates 2 and of the sealing bars.

In operation, the two-phase oxygen leaving the face 3 of the exchanger body is collected in the bulb 6, which forms a phase separator, and that part of the bulb which projects forwards with respect to the body 1 forms a liquid storage container. The liquid oxygen is discharged, for the purpose of recycling it at the base of the exchanger, via a liquid outlet orifice 24 located close to the lowermost point of the bulb, while the gaseous oxygen is discharged via a gas outlet orifice 25 located in the vicinity of the uppermost point of the bulb. The two orifices 24 and 25 lie on the hemisphere 20.

In an alternative form, not shown, the bulb 6 could project from the two, front and rear, sides of the body 1. To do this, the metal sheets 13, 15 and 16 would be replaced with a single semicylindrical metal sheet having an axis 17, and arranged on the rear side would be a bulb part identical to the part 19, overlapping the top edge 8 and connected, on the one hand, to the semicylindrical metal sheet and to the top edges 9 and 10 and, on the other hand, to the rear face of the exchanger body.

In yet another alternative form, the width of the bulb 6, that is to say its vertical dimension in FIG. 2, may be less than that of the body 1. In this case, a semicylindrical metal sheet having an axis 17 or an axis parallel to this axis 17 is preferably interposed between the parts 12 and 15 of the bulb.

FIGS. 5 to 7 show a fluid inlet or outlet dome 6A connected by welding along the entire periphery of the top face 3 of the exchanger body 1, which top face has a square shape. This dome consists of five metal sheets:

a hemispherical central metal sheet 20A whose vertical central axis X—X is coincident with that of the face 3; and four metal sheets 22A in the form of half-cones of 90° opening. Each metal sheet 22A has its vertex on one corner of the face 3 and is tangential to the metal sheet 20A along a semicircle 26.

The hemispherical portions delimited by the semicircles 26 are removed, and the metal sheets 20A, 22A are welded together along these four semicircles. The dome 6A is joined to the body 1 along the eight bottom generatrices of the half-cones.

The dome 6A, like the bulb 6 in FIGS. 1 to 4, is easy to connect to a parallelepipedal exchanger body. In addition, they withstand the internal pressures particularly well so that it is possible to use them in many applications where the fluid supplied to or discharged through them is under pressure.

FIGS. 5 to 7 also show a cylindrical pipe 27 for supplying or draining-away the fluid, this pipe having an axis X—X and being connected directly to the hemisphere 20A along a circle 28. The top spherical cap of the metal sheet 20A, lying within the circle 28, is then removed, of course.

However, as illustrated in FIG. 8, the pipe 27 may be inclined with respect to the axis X—X, the more so the smaller its diameter, the key point being that the entire perimeter of this pipe cuts the hemisphere.

It may thus be seen that the construction of the dome 6A gives a great deal of freedom for tapping off supply or discharge pipes. This in turn makes it easier to connect the exchanger body to apparatuses taking up a relatively small amount of space, for example in the case of certain compressor inter-stage heat exchangers.

As an alternative (FIG. 9), in order to soften the transition between the pipe 27 and the cavity of the dome, and consequently to reduce the head losses, a transition metal sheet 29 in the form of a truncated cone, having an axis coincident with that of the pipe and an opening equal to 90° for example, may be connected via its small base to the pipe and via its large base to the metal sheet 20A.

FIGS. 10 and 11 show an alternative form 6B of the dome 6A, adapted to the case of a rectangular face 3, for example because the body 1 consists of two identical exchanger bodies welded side by side along a vertical weld line 30.

In this case, the dome 6B is produced by splitting the dome 6A into two half-domes, each comprising a quarter of a sphere 20B and two half-cones 22A, and by adding an additional, semicylindrical metal sheet 31 connected via its axial ends to the limiting semicircles 32 of the metal sheets 20B and via its edges to the lateral top edges 9 and 10 of the exchanger body.

It may be understood that such an arrangement allows the dome to be extended at will, so that the same structure can also be used to make up the inlet/outlet boxes of the exchanger, such as the box 4 in FIGS. 1 and 2.

In other alternative forms, not shown, the shape of the chamber 6, 6A, 6B may be modified by horizontal or vertical affinity in one direction or the other, which transforms the circular cylinders into circular or elliptical cylinders, the spheres into ellipsoids and the cones into cones.

Moreover, whatever its shape, the chamber may be produced from a single metal sheet by deforming it, in particular by deep drawing, progressive forming of the forging type, etc. This is also possible using a small number of metal sheets, the cutting of which does not necessarily correspond to the various geometrical surfaces described above.

In all cases, the chamber according to the invention consists of surfaces which are tangential to each other along their lines of connection. This provides advantageous continuity of the stress field which develops as a result of the pressure.

We claim:

1. An inlet/outlet chamber for a fluid, said chamber for being connected with a leaktight joint to a face of a body part of an apparatus in which the fluid circulates, said chamber comprising:
   two spherical or ellipsoidal portions and four sectors of cones tangential in pairs to said spherical or ellipsoidal portions;
   said chamber being for connection to an entire perimeter (8 to 10) of said face (3),
   said spherical or ellipsoidal portions being substantially tangential to two opposite sides of a rectangle or of a square formed by said face, and said sectors of cones having vertices lying on the four corners of said face, respectively.

2. The inlet/outlet chamber as claimed in claim 1, wherein said spherical or ellipsoidal portions are quarters of a sphere or of an ellipsoid, a meridional plane of which is contained in said face (3), and wherein the sectors of cones (22A) are half-cones having an opening of 90°.

3. The inlet/outlet chamber as claimed in claim 1, wherein said two spherical or ellipsoidal portions are joined together into a single spherical surface (20A).

4. The inlet/outlet chamber as claimed in claim 2, wherein said two spherical or ellipsoidal portions are joined together into a single spherical surface (20A).

5. The inlet/outlet chamber as claimed in claim 1, wherein said opposite sides are the short sides of a rectangle formed by said face and the chamber (6B) furthermore includes a cylindrical surface (30) connected to the circular edges, perpendicular to said face, of said two spherical or ellipsoidal Dortions (20B).

6. The inlet/outlet chamber as claimed in claim 2, wherein said opposite sides are the short sides of a rectangle formed by said face and the chamber (GB) furthermore includes a cylindrical surface (30) connected to the circular edges of the two spherical or ellipsoidal portions (20B), these circular edges being perpendicular to said face.

7. A fluid circulation apparatus comprising a part of a body (1) which includes a fluid inlet or outlet first face (3) and an inlet/outlet chamber for said fluid connected with a leaktight joint to said first face, at one part of the chamber comprising at least one spherical or ellipsoidal portion (20; 20A; 20B) and of sectors of cones (22; 22A) tangential to said spherical or ellipsoidal portion, wherein each said sector of a cone is defined by a vertex of the cone and at least a portion of a generatrix for the cone which forms said leaktight joint of said chamber to said first face.

8. The inlet/outlet chamber as claimed in claim 7, which includes a feed or discharge pipe (24, 25; 27) tapped off directly from the spherical or ellipsoidal portion (20; 20A; 20B).

9. The inlet/outlet chamber as claimed in claim 7, which includes a feed or discharge pipe (27) tapped off from the spherical or ellipsoidal portion (20A) via a transition surface (28) in the form of a truncated cone.

10. The inlet/outlet chamber as claimed in claim 9, wherein the transition surface is tangential to the spherical or ellipsoidal portion.

11. The inlet/outlet chamber as claimed in claim 7, which projects, with respect to said body part (1), beyond said face (3) and is also connected with a further leaktight joint to an adjacent face (11) of said body part.

12. The inlet/outlet chamber as claimed in claim 11, wherein the spherical or ellipsoidal portion (20) is a hemisphere or a semi-ellipsoid surmounting a top edge (7) of the today which joins the two faces (3, 11) and wherein the chamber (6) furthermore comprises another part (12) formed by three cylindrical surfaces (13, 15, 16) having mutually perpendicular axes.

13. The inlet/outlet chamber as claimed in claim 7, which consists entirely of surfaces, especially spherical or ellipsoidal, conical and cylindrical surfaces, which are joined together tangentially.

14. The apparatus as claimed in claim 7, wherein said part of the body (1) is formed by a stack of parallel plates (2) defining between them flat passages, the chamber (6; 6A 6B) being connected to said first face and to a second face of said body adjacent said first face only along zones formed by end portions of the plates (2).

15. The apparatus as claimed in claim 7, wherein the chamber (6A; 6B) is joined to said part of the body (1) tangentially.

16. The apparatus as claimed in claim 14, wherein the chamber (6A; 6B) is joined to said part of the body (1) tangentially.

17. The apparatus of claim 7, further comprising a gas vent at an upper part of said spherical or ellipsoidal portion and a liquid drain at a lower part of said spherical or ellipsoidal portion.

18. The apparatus of claim 7, comprising one said spherical or ellipsoidal portion and two said sectors of cones that are tangential to said one spherical or ellipsoidal portion and that join opposite sides of said face at a straight joint along said generatrices.

19. An inlet/outlet chamber for being joined with a leaktight joint to at least one linear part of a water circulation device, said chamber comprising:
   a first three-dimensional surface which is a portion of a sphere or an ellipsoid; and
   a second three-dimensional surface which is a portion of a cone that is tangential to said portion of a sphere or an ellipsoid, said portion of a cone including a vertex of the cone and at least a portion of a generatrix of the cone which is for being joined to the linear part of the water circulation device.

20. The chamber of claim 19, wherein said vertex of the cone is for being placed along an imaginary extension of the linear part of the water circulation device.

21. The chamber of claim 19, wherein said vertex of the cone is for being placed at a corner of the water circulation device.

22. The chamber of claim 19, wherein said portion of a sphere or an ellipsoid is a substantial part of a hemisphere.

23. The chamber of claim 19, wherein said portion of a cone is at least three quarters of the cone.

24. The chamber of claim 19, comprising two of said portion of a cone.

25. The chamber of claim 24, wherein each of said two portions of a cone has a generatrix which forms an extended straight line with a generatrix of the other cone.

26. The chamber of claim 19, further comprising three cylindrical surfaces with mutually perpendicular axes, two of said cylindrical surfaces tangentially joining said portion of a sphere or an ellipsoid.

* * * * *